Patented Mar. 27, 1928.

1,663,914

UNITED STATES PATENT OFFICE.

FRANS GEORG LILJENROTH, OF STOCKHOLM, SWEDEN.

METHOD OF OXIDIZING AMMONIA BY MEANS OF OXYGEN.

No Drawing. Application filed June 13, 1927, Serial No. 198,592, and in Sweden August 19, 1926.

In oxidizing ammonia for the purpose of its conversion into nitric acid oxygen in the form of atmospheric air is generally used. As in such process two volumes of oxygen is required for each volume of ammonia, the reaction mixture will be diluted with eight volumes of nitrogen. This causes on one hand the drawback that the nitric oxide obtained in the catalytic oxidation of the ammonia will be highly diluted with nitrogen with the result that the following oxidation of the nitric oxide into nitrous gases and the condensation of the latter into nitric acid will be performed rather slowly and that for such reason a rather large and expensive absorption system must be used. On the other hand the use of air and the dilution of the reaction mixture with the large quantity of nitrogen involve the advantage that the rise of temperature occurring in the oxidation will be limited to such a low value that the risk of an explosion-like combustion is avoided.

It has also been proposed to substitute oxygen for the air as oxidizing agent and to eliminate the risk of explosion by adding to the reaction mixture a portion of the reaction products obtained in the oxidation after suitable cooling whereby the reaction temperature is lowered in the desired degree. The percentage of oxygen was in such case so related to the quantity of ammonia that the portion of the reaction products carried off to the condensation system practically did not contain more oxygen than the quantity necessary to the conversion of the nitric oxide into nitric acid for the purpose of obtaining a rapid condensation into nitric acid.

The inventor has now found that contrary to the prevailing opinion it is not necessary or even most suitable to work with the theoretical quantities of nitrogen oxide and oxygen and completely condense them in the condensation system when oxygen is used as oxidizing agent but that the condensation of the nitric oxide to nitric acid takes place more rapidly if an excess of one of these gases is used or if in using equivalent quantities of the two gases the condensation is only partly performed, the excess of gas or gases being in both cases utilized as diluting agent for the mixture of ammonia and oxygen in the continuous performance of the oxidizing process, so that the risk of an explosion-like combustion is eliminated. According to this invention the whole gas mixture escaping from the catalyzer furnace is after suitable cooling supplied to the condensation system wherein a comparatively small portion thereof is converted into nitric acid while the remainder is returned to the catalyzer furnace. Said returned gas quantity consists according to the circumstances mainly of oxygen or mainly of nitric oxide or of nitric oxide and oxygen in equivalent quantities to form nitric acid and the composition of the circulating gas can be regulated partly by regulating the condensation to nitric acid and partly by regulating the supply of fresh oxygen in relation to the supply of ammonia. The supply of fresh oxygen shall normally correspond to the quantity necessary for the conversion of the freshly supplied ammonia into nitric acid, but can temporarily be increased or decreased, thus influencing immediately the composition of the circulating gas so that its percentage of oxygen is increased or decreased.

By the circulation of the whole quantity of gas escaping from the catalyzer furnace through the condensation system and the return of the excess to the catalyzer furnace the advantage is also gained that no losses of nitrogen occur on account of incomplete condensation as is the case when only a portion of the reaction products from the catalyzer furnace are supplied to the condensation system and the gases escaping from this latter are carried off to the atmosphere.

In the latter case it was necessary for the purpose of avoiding losses of nitrogen to erect a large and expensive water absorption system followed by an alkali absorption system. In working according to this invention it will be sufficient to use a rather incomplete condensation. A calculation shows that if a gas mixture containing 9% by volume of ammonia is used in the catalyzer furnace and nitric oxide is used as diluting means it is sufficient to condense 18% of the total quantity of nitric oxide in the gas mixture escaping from the catalyzer furnace while the remainder is returned to the catalyzer furnace. Such condensation can be effected in a rather small and cheap condensation installation. In practice it is possible without risk of an explosion-like combustion in the catalyzer furnace to work with a higher percentage of ammonia than 9% by volume and in using a percentage of ammonia of 12.5% by volume it will be sufficient to condense 26% of the total quantity of nitric oxide in the gas mixture escaping from the catalyzer furnace. By a suitable arrangement of the catalyzer and by an effective cooling thereof a still higher percentage of ammonia in the gas mixture supplied to the catalyzer furnace may be allowed. If the catalyzer furnace is so constructed that a gas mixture containing 20% by volume of ammonia can be used therein, it is sufficient to condense 47% of the nitric oxide in the gas mixture escaping from the catalyzer furnace.

What I claim is:—

1. Method of continuously oxidizing ammonia, which comprises subjecting ammonia to a catalytic combustion by means of oxygen essentially in absence of gases alien to the reaction, supplying the whole resulting gas mixture to a condensation system and condensing a part thereof to nitric acid while the remainder is used as diluting agent in performing the catalytic combustion.

2. Method of oxidizing ammonia, which comprises forming a non-explosive gas mixture consisting essentially of ammonia, oxygen and nitric oxide, subjecting said gas mixture to a catalytic combustion, supplying the whole resulting gas mixture to a condensation system, wherein a part of the condensible products is condensed, and using the remainder in forming the gas mixture to be combusted in continuously performing the operation.

In testimony whereof I have signed my name.

FRANS GEORG LILJENROTH.